Dec. 7, 1943. P. W. NETTESHEIM 2,336,119
DIRECT AND INDIRECT LAMP
Filed May 26, 1941 4 Sheets-Sheet 1
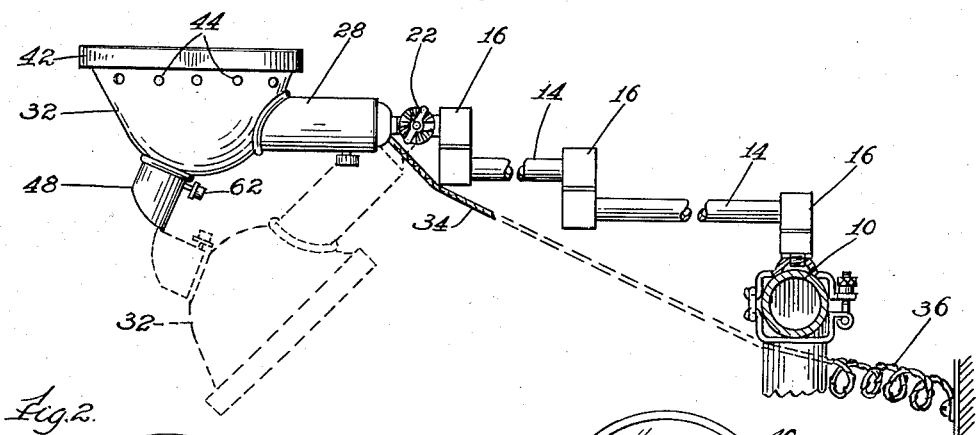
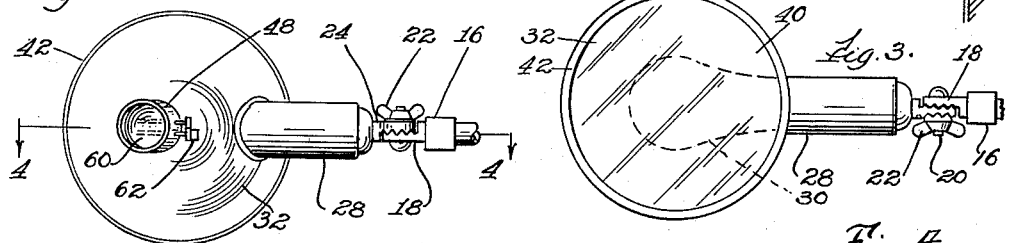
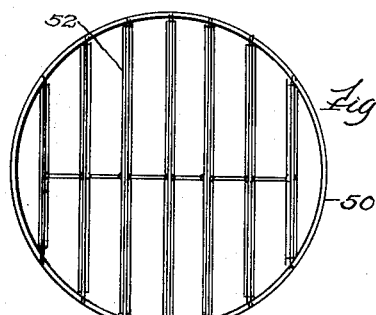
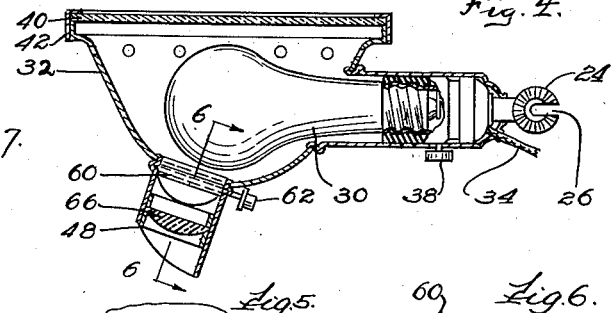
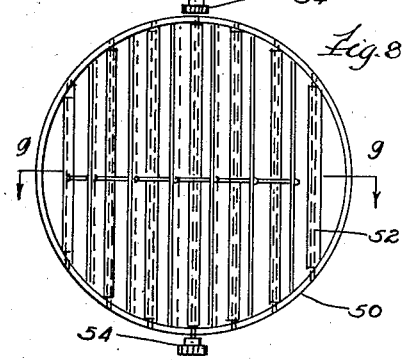
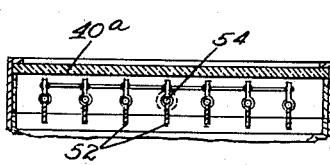
Inventor
Peter W. Nettesheim
by Albert  Fihe
Attorney Dec. 7, 1943.   P. W. NETTESHEIM   2,336,119
DIRECT AND INDIRECT LAMP
Filed May 26, 1941    4 Sheets-Sheet 2
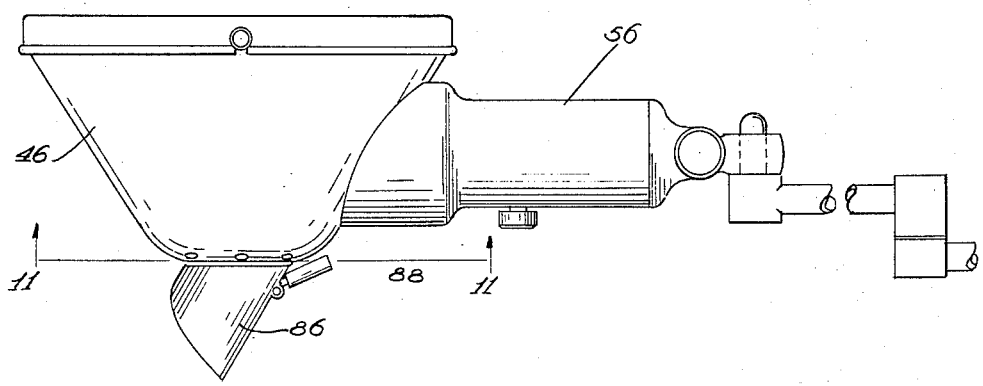
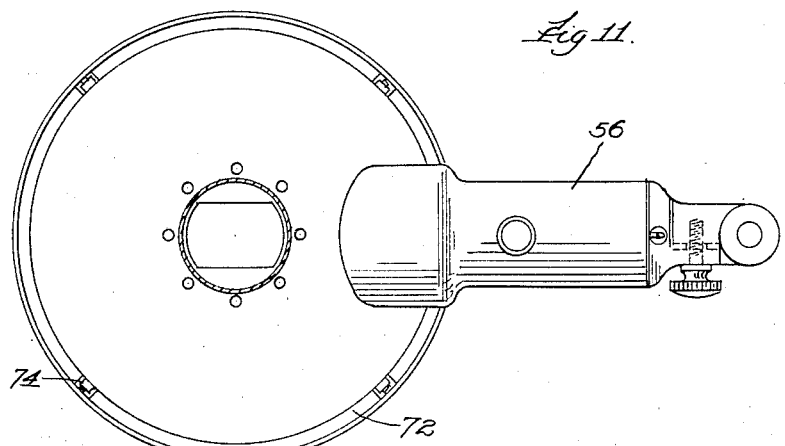
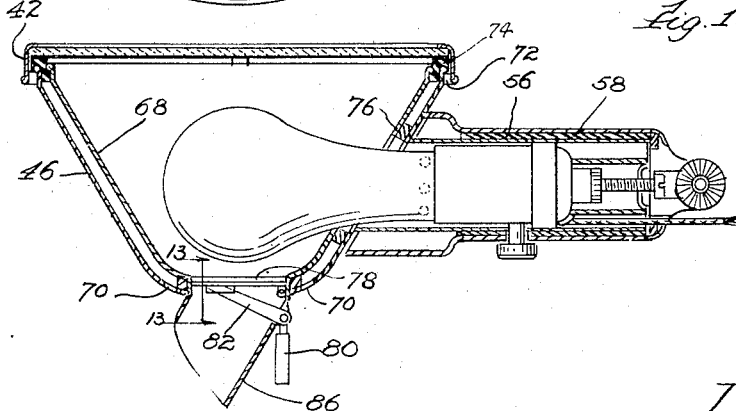
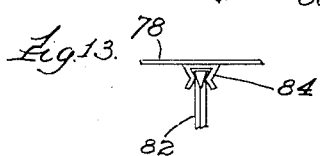
Inventor
Peter W Nettesheim
by Albert J Frhe
his Attorney

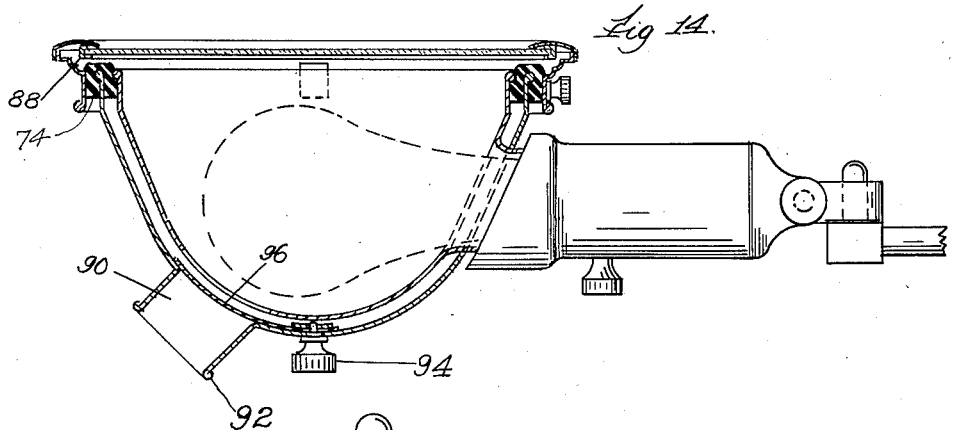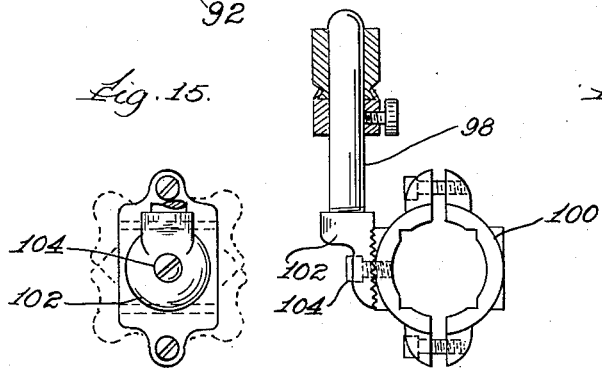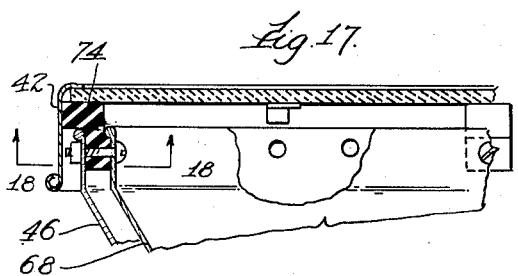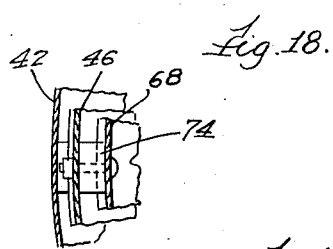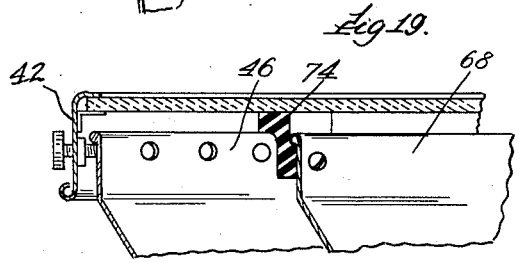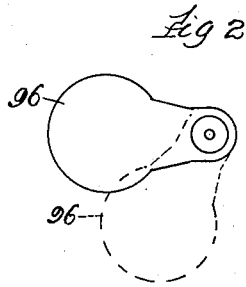

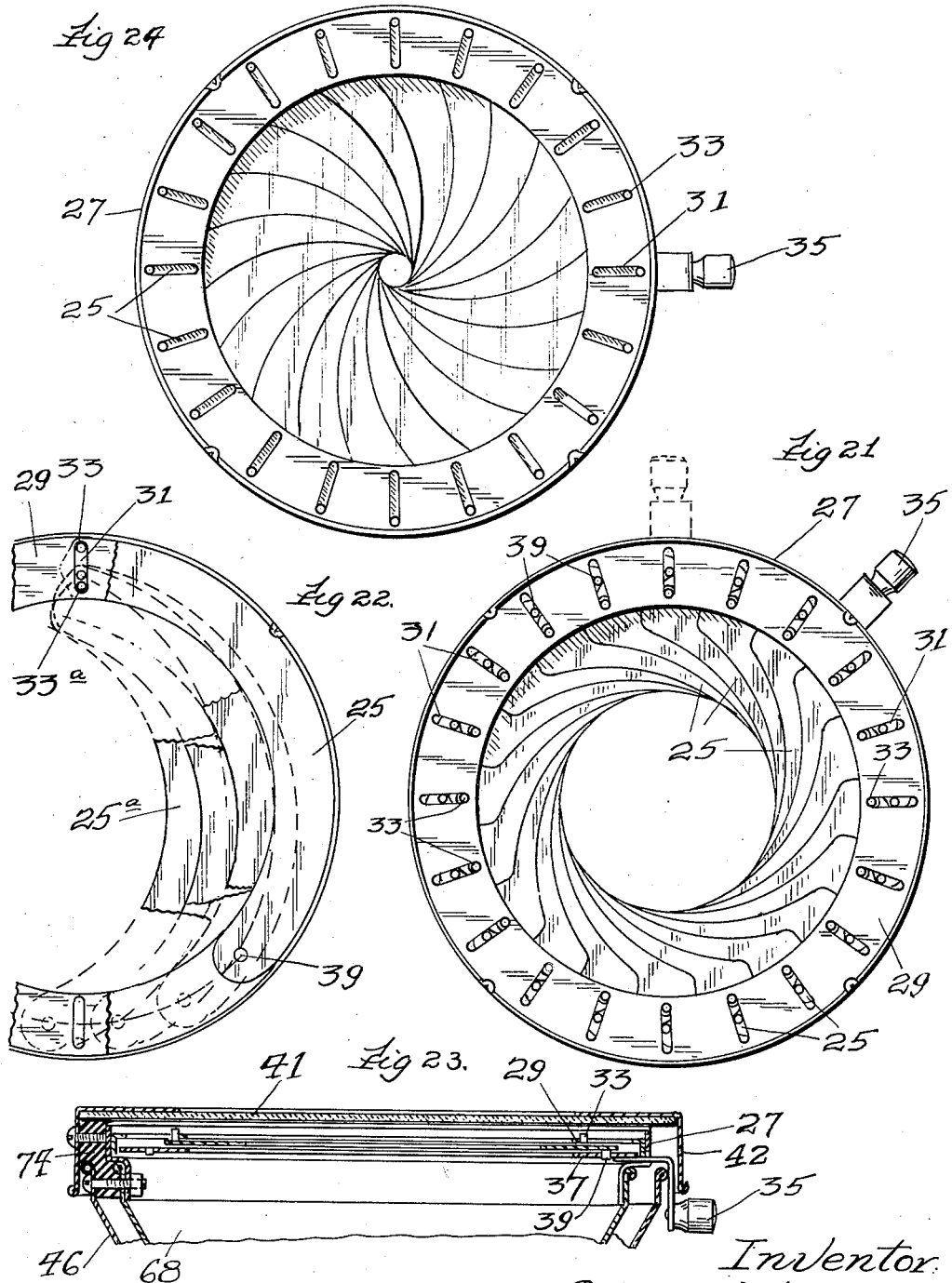

Patented Dec. 7, 1943

2,336,119

UNITED STATES PATENT OFFICE 2,336,119

DIRECT AND INDIRECT LAMP

Peter W. Nettesheim, Chicago, Ill.

Application May 26, 1941, Serial No. 395,253

1 Claim. (Cl. 240—41)

This invention relates to an improved combination direct and indirect lamp and has, for one of its principal objects, the provision of a lamp or lighting unit which is particularly adapted for use in hospitals or the like but which may be employed in any other associations and environments.

One of the important objects of this invention is to provide a lamp or lighting unit which can be readily attached to a patient's bed in a hospital or which may be applied to a bed in an ordinary dwelling and the efficiency of which unit is such that a single device will suffice for satisfactorily lighting an ordinary room and preferably in an indirect manner.

Another object of the invention is to provide in a lighting unit, means for concentrating the beam of light so that a small area may be illuminated leaving the remainder of the room in darkness. This makes the device particularly adaptable for use in hospital wards where one patient may wish to read while another patient may require sleep. A further object of the invention is the provision of a readily adjustable lighting unit whereby the light from the same may be directed onto any object in a room or dispersed throughout the room and which, furthermore, may be controlled in intensity.

An additional object is to provide a lamp which can be readily extended or retracted either while in use or when not being used so that it may be quickly put out of the way in emergencies or the like.

Another and still further important object of the invention is to provide a lamp or the like for hospitals or similar places wherein the lamp itself can be readily detached from its support and moved over a considerable area, thereby providing light either in concentrated or dispersed form at any desired point and practically throughout a room.

Other and further important objects of the invention will be apparent from the disclosures in the accompanying drawings and following specification.

The invention, in several preferred forms, is hereinafter more fully described.

In the drawings:

Figure 1 is a side elevation of the improved combination direct and indirect lamp of this invention, showing the same in operative position and illustrating same in two different relationships.

Figure 2 is a bottom view of the improved lighting unit of this invention.

Figure 3 is a top plan view of the lamp.

Figure 4 is a sectional view taken on the line 4—4 of Figure 2, looking in the direction indicated by the arrows.

Figure 5 is a detail view, showing the tube for directing and confining the light to a limited area or spot.

Figure 6 is a sectional view taken on the line 6—6 of Figure 4.

Figure 7 is a top plan view of the lamp, illustrating a modification.

Figure 8 is a view similar to Figure 7 only showing the device in another position.

Figure 9 is a sectional view taken on the line 9—9 of Figure 8.

Figure 10 is a side elevation illustrating a slightly modified form of the invention.

Figure 11 is a bottom plan view of the device of Figure 10, parts being removed.

Figure 12 is a vertical sectional view of the structure shown in Figures 10 and 11.

Figure 13 is a detail section taken on the line 13—13 of Figure 12.

Figure 14 is a sectional view illustrating a further modification of the invention.

Figure 15 illustrates an improved form of clamping means whereby the device may be attached to a bedstead or the like.

Figure 16 is a side elevation of the clamp of Figure 15.

Figure 17 is a detail sectional view of portions of the structure illustrated in Figures 10, 11 and 12.

Figure 18 is a section taken on the line 18—18 of Figure 17.

Figure 19 is a detail view, partly in section, parts being broken away, illustrating a modification of the structure of Figure 17.

Figure 20 is a detail of the closure for the lamp of Figure 14.

Figure 21 is a detail view of an iris diaghragm used for controlling the amount of light emanating from the top portion of the light and shows the iris diaphragm in half closed position.

Figure 22 is a detail view showing one section of the iris diaphragm of Figure 21 and illustrating this section in different positions conforming to the opening and closing thereof.

Figure 23 is a sectional view showing the iris diaphragm in position at the top of the lamp of this invention.

Figure 24 is a view of the diaphragm similar to Figure 21 but showing the device in practically closed position.

As shown in the drawings:

The reference numeral 10 indicates the supporting bracket for the improved lighting unit of this invention, the same being in the form of a lamp or the like adapted to be readily and conveniently fastened to any desired support, in this particular case, the support comprising a bedstead.

Mounted on the bracket 10 is a flexible extensible bracket element comprising rods 14 and frictional joints 16. The frictional joints can be of any desired construction, examples being illustrated in United States Patents Nos. 1,589,845, 2,048,313, 2,088,321 and 2,119,987.

Mounted on the outermost friction joint 16 is an extension 18 in the form of a disk (Figure 3) having an opening therethrough for the reception of a bolt 20. A winged nut 22 is mounted on this bolt, and the disk-like extension 18 has a series of radial corrugations or grooves in its face such as best illustrated in Figure 4, which corrugations cooperate with similar radial corrugations on a corresponding element 24 (Figure 4). The element 24 has an open slot formed therein as illustrated at 26, thereby permitting this portion to be readily removed from the portion 18 when a winged nut 22 is loosened.

A light socket 28 is formed on the portion 24 and a source of light 30 is mounted in the socket. A shade 32 of conventional or any other desired shape surrounds the source of light, and the lamp socket 28 may form a handle for ready moving of the lamp shade from one place to another when the element 24 has been detached from the element 18.

A current-carrying cord 34 is connected to the socket or handle portion 28 as best shown in Figures 1 and 4, and this current-carrying cord terminates in a coil or the like 36 as illustrated in Figure 1 whereby the same can be extended and whereby it will be automatically retracted when the extending tension is released. This coil 36 may be any one of a convenient or well-known number of units as, for example, a spring steel helix to which the current carrying cord is affixed at intervals. The source of light may be such that its brilliancy or intensity may be controlled by means of a switch 38 connected to two or more filaments in the bulb 30.

Mounted in the top of the shade 32 is a pane of glass 40 which is preferably of some tough and heat-proof composition such as that glass known as Pyrex. This is mounted in a frame 42 which can be readily removed from the shade 32, being preferably mounted thereon by means of a pressed fit. Ventilating openings 44 are provided in the shade 32.

At the bottom of the shade 32 is an opening terminating in a substantially cylindrical extension 48. This extension is curved on its outer end so that when the lighting unit is in the position shown in the full lines in Figure 1, any light which passes through the extension 48 will be directed in a practically parallel beam and almost directly downwardly and slightly outwardly so that when the entire device including the brackets, etc. is properly positioned on the head of a bed, light rays passing through the open extension 48 will not shine directly into the face of patients on the bed. Obviously, the device can be so controlled by means of the winged nut 22 and its appurtenances that light issuing from the tubular extension 48 will be projected directly onto any particular object which the user of the lamp desires to illuminate. For example, the patient may wish to read while leaving the rest of the room in comparative darkness. This can obviously be easily accomplished by the use of the device of this invention because the glass plate 40 on the top of the shade or housing 32 can be replaced by means of a framework 50 which contains a series of movable louvres 52 which may be opened and closed at will by manipulation of a handle 54 as best illustrated in Figures 7 to 9 inclusive. The louvres are shown closed in Figure 7 and open in Figure 8. Obviously, any intermediate position may be adopted whereby light passing upwardly from the housing 32 can be regulated and controlled in intensity and the consequent illumination of the room in which the lamp is placed will also, accordingly, be so regulated.

A shutter or series of shutters 60 may be provided in the extension 48 as best illustrated in Figures 4 and 6, and these shutters can be controlled by means of a manually operated knob or the like 62 whereby light coming through the tubular extension 48 can also be controlled through practically any desired range from quite bright to almost complete darkness. Obviously, the control of the light passing through the cylindrical element 48 can be otherwise than by means of the shutters 60 illustrated, these shutters and the control handle 62 and gears 64 being merely one embodiment of this particular phase of the invention. For example, a circular operating shutter such as that ordinarily used in modern cameras can be employed to advantage.

It will be seen that herein is provided a combination direct and indirect lighting unit which can very readily be used as the single source of illumination in a hospital room or the like in that light rays passing from a source can be directed upwardly through the glass pane 40 and onto a ceiling or the like whereupon they will be reflected downwardly, thereby providing a very good indirect illumination. The source of light 30 together with the shade 32 should be arranged at a level above that of the eyes of the ordinary person so that the indirect lighting effect will also be obvious to persons entering the room such as visitors, doctors, nurses or the like.

If desired, a condensing lens can be inserted in the tubular extension 48 as illustrated at 66 in Figures 4 and 6 whereby a more parallel beam of light can be brought out from the bottom of the shade and directed onto a book or onto any portion of the anatomy of a patient.

Any one of the elements 16 can be made with a reversible pivot body. In other words, the top portion can be readily removed by lifting same off of the supporting pivot pin after which the lamp 28—32 can be turned upside down into the position shown in the dotted lines in Figure 1, and the upper portion of the pivot body 16 replaced. In this manner, a reversing of the lamp can be accomplished without even a loosening of the winged nut 22.

Set screws may be employed at the clamp 10 whereby the same will be held more firmly in desired position on the bed structure, and a lining of felt or other cushioning material may also be employed so that the bed will not be unduly marred by the application of the lamp of this invention.

The vent holes 44 may be moved up into the upper rim of the shade 32, and the ring-like element 42 may be somewhat spaced from this upper rim so that free escape of heated air from the housing 32 will take place.

Obviously, if the indirect lighting is to be controlled, the louvres 52 can be readily brought into play. The lamp housing 32 can be readily turned upside down and supported in that position as shown in the dotted lines in Figure 1 wherein the greater part of the illumination can be directed downwardly if such a condition is desired. A glass plate 40a similar to the plate 40 may be used above the louvres 52 in the sustaining frame 50 which can readily replace the frame 42 which supports the glass plate 40.

If the lamp is wished for some particularly close work as for the careful inspection of a portion of a patient's anatomy in a hospital, the winged nut 22 may be loosened and the portion 24 removed from the adjacent portion 18 whereupon the lamp can be carried to a place remote from the bracket 14—16 and the light used with good effect in such relationship. If a rather extensive area is to be illuminated, the light may be allowed to pass through the plate 40 or if a more concentrated area is to be inspected, the lower opening and extension 48 may be employed, and the concentrating lens 66 may even be used.

The housing 46 of Figure 10 is provided with a slightly different shaped handle 56 made in two parts as best shown in Figure 12 with a layer of insulating material 58 there-between whereby the handle will not become overheated in use. Obviously, the handle may be covered with some layer of insulating material such as cloth, felt or some composition if additional heat insulating qualities are desired. The housing 46 of Figures 10, 11 and 12 is made with an inner shell 68 and with ventilating openings 70 at the bottom and with an annular ventilating space 72 at the top, the shell portions 46 and 68 being held apart by means of spacers 74. An insulating ring 76 is provided around the port where the light globe enters the housing so that there will be no leakage of light at this point, and, at the same time, suitable insulation and ventilation is accomplished.

The extension 86 may be shaped somewhat similar to the extension 48 of Figures 1, 2 and 4. A slightly different closure element is provided, this being in the form of a hinged plate 78 operated by a handle 80 mounted on the outside of the tubular extension 86. This handle has an inwardly projecting element 82, the end of which fits between a pair of prongs 84 mounted on the under-face of the plate 78 (Figure 13) and whereby manipulation of the shutter or plate 78 is readily accomplished.

In Figure 14 is illustrated a further modified form of the invention wherein there is a space 88 provided at the upper periphery of the housing for the insertion of an iris shutter such as used in cameras. The extension 90 is shown as cylindrical and with a bead 92 at its lower end and a reading spot control turn button 94 is provided which operates a shutter or a slide 96 as best shown in Figure 20.

In Figures 15 and 16, there is illustrated a special form of clamp whereby the lamp may be positioned on almost any type of bedstead while still having its original support 98 maintained in a vertical position. This comprises a clamping element 100 having a serrated front face on which is mounted a support 102 for the bracket pin 98, and this support 102 is held in place by means of a screw or the like 104 so that if the clamping element 100 is mounted on that portion of a bed which is not horizontal, the pin 98 may be moved to a vertical position, and the screw 104 accordingly adjusted.

Obviously, this clamp as shown in Figures 15 and 16 may be applied to other modifications of the invention, and the iris shutter described in connection with Figure 14 may be used instead of the louvre illustrated in Figures 7, 8 and 9. Also, the handle construction illustrated in Figure 12 may be employed with any and all embodiments of the invention.

Figures 17, 18 and 19 show, in more complete detail, the double shell construction of the improved lamp of this invention, the outer shell being illustrated at 46 and the inner shell, which is nested thereinto, being shown at 68. Combination spacers and insulating elements 74 are positioned between the shells at intervals around the periphery of the upper rim, these being made of some resilient material so that breakage is reduced to a minimum and ventilation and escape of heat is accomplished as heretofore described.

Figure 20 shows in more detail the shutter 96 for closing the opening to the tube 90 which directs part of the light downwardly, the association of this shutter 96 with the remainder of the structure being best illustrated in Figure 14.

In Figure 21 is illustrated the iris diaphragm and its operating connections as the same is adapted to be positioned at the top of the lamp structure 46—68 and underneath the pane of glass 41, all as shown in Figure 23. The iris diaphragm includes essentially a series of semi-circular shutters 25 mounted in a supporting frame 27, which frame is circular in shape and fits into the top of the lamp structure as llustrated in Figure 23. Fixedly mounted in the circular frame element 27 is an annular plate 29 having a plurality of slots 31 therein and spaced there-around at regular intervals. A pin 33 is mounted adjacent the end of each shutter. The element 25 and each of these pins slides freely in its corresponding groove 31.

An operating handle 35 is provided, and this handle is attached to another annular plate 37 (Figure 23) which is also mounted in the supporting ring 27 and in parallel but spaced relationship to the upper annular ring 29.

This lower ring 37 is provided with openings spaced there-around, the openings being the same distance apart and corresponding in number to the slots 31 in the upper ring 29. Into each of these openings in the ring 27 is fitted a pin 39, which pin is mounted on a corresponding iris diaphragm section 25 but at the end thereof opposite to the end into which is fitted the upstanding pin 33. These pins 33 and 39 and their relationship to the remainder of the structure are better shown in the detailed illustration of Figure 22.

As the handle 35 is moved around the periphery of the frame 27, it carries with it the lower ring 37 and, accordingly, the pins 39 which, therefore, move the respective iris diaphragm shutter sections 25 about their other ends which are constrained to move in the grooves 31 by reason of the pins 33 operating therein. When the iris diaphragm is completely open, the pins 33 are all at the outer extremity of the respective slots 31, this position being illustrated in the full lines in Figure 22. As the handle 35 is moved around the ends of the shutter sections opposite to the pins 33 are carried around with the ring 37, thereby pulling the pins 33 inwardly in the slots 31 until the position 25a (Figure 22) is reached, which corresponds to approximately a half-way closing of the shutter or diaphragm, this being illustrated more fully in Figure 21. At this juncture, the pins 33 are at the innermost extremities of the slots 31 as indicated by the reference numeral 33a in Figure 22. If the handle 35 is carried past this half-way point, the pins 33 will then again move outwardly in the slots 31 and when the iris diaphragm is approximately completely closed, the pins 33 will again have arrived at the outermost limits of the respective slots, all as shown in Figure 24.

It will be evident that herein is provided a lighting unit for hospital rooms and the like which serves a great number of purposes. It provides an indirect lighting unit by means of which a whole room may be illuminated, and such illumination may be very carefully and accurately controlled. The lamp further provides a restricted illumination in the form of a spot light whereby the light may be concentrated or localized. Additionally, the lamp may be very readily moved from place to place, the supporting bracket itself being capable of considerable adjustment, and if this is not sufficient, the lamp may be actually removed from the bracket so that very careful and accurate inspection of parts of a patient's anatomy or similar or related objects may be conveniently had to a much greater advantage than has heretofore been possible. Further, the lamp need not be associated directly with the bed but may be mounted on a wall support or other element, but if it is associated with the bed, it is normally out of the patient's way while, at the same time, being readily accessible for control.

I am aware that many changes may be made and numerous details of construction varied throughout a wide range without departing from the principles of this invention, and I, therefore, do not purpose limiting the patent granted hereon otherwise than as necessitated by the prior art and the terms of the claim.

I claim as my invention:

A combination direct and indirect lighting unit, comprising an adjustable arm, a lamp thereon, a shade about the lamp, the shade being open at both the top and bottom whereby light may be projected both upwardly and downwardly, a heat insulated handle for the lighting unit, said shade comprising a pair of internested metal shells, spacers between the shells, a glass dust-proof cover on the shade, said spacers also supporting the cover in shock-proof relationship, an iris diaphragm at the top of the shade and a glass cover over the diaphragm.

PETER W. NETTESHEIM.